United States Patent [19]

Bragg

[11] Patent Number: 4,676,315
[45] Date of Patent: Jun. 30, 1987

[54] METHOD FOR CONCENTRATING SURFACTANT FROM A BRINE SOLUTION

[75] Inventor: James R. Bragg, Houston, Tex.

[73] Assignee: Exxon Production Research Company, Houston, Tex.

[21] Appl. No.: 826,421

[22] Filed: Feb. 5, 1986

[51] Int. Cl.$^4$ .................. E21B 43/22; E21B 43/40
[52] U.S. Cl. .................. 166/266; 252/303; 252/325; 252/8.554; 210/910
[58] Field of Search .............. 166/266, 267; 252/8.55 D, 303, 325; 210/729-736, 704, 705, 711, 910, 625, 708

[56] References Cited

U.S. PATENT DOCUMENTS

| 3,687,845 | 8/1972 | Treat et al. | 210/54 |
|---|---|---|---|
| 3,850,898 | 11/1974 | Ide et al. | 210/733 |
| 4,057,495 | 11/1977 | Kinoshita et al. | 210/705 |
| 4,175,054 | 11/1979 | Tait et al. | 252/331 |
| 4,216,079 | 8/1980 | Newcombe | 208/188 |
| 4,277,352 | 7/1981 | Allison et al. | 252/8.55 D |
| 4,337,159 | 6/1982 | Reed et al. | 252/8.55 D |
| 4,356,095 | 10/1982 | Leavitt | 252/8.55 D |
| 4,370,238 | 1/1983 | Tackett et al. | 208/188 |
| 4,513,820 | 4/1985 | Maddox, Jr. | 166/266 |
| 4,516,635 | 5/1985 | Maddox, Jr. | 166/266 |
| 4,518,038 | 5/1985 | Maddox, Jr. | 166/266 |
| 4,548,707 | 10/1985 | Wolf et al. | 166/267 |
| 4,551,602 | 11/1985 | Inoue et al. | 210/711 |
| 4,559,148 | 12/1985 | Ashrawi et al. | 255/8.55 D |
| 4,589,998 | 5/1986 | Bragg et al. | 252/330 |
| 4,597,874 | 7/1986 | Francis, Jr. | 166/267 |

Primary Examiner—Stephen J. Novosad
Assistant Examiner—Bruce M. Kisliuk
Attorney, Agent, or Firm—Karen T. Burleson; Jeffrey M. Hoster

[57] ABSTRACT

A method is disclosed for concentrating surfactant in an aqueous solution. The method comprises adding to the solution a component incompatible with the surfactant, such as a water-soluble polymer, thereby displacing the surfactant from the aqueous phase of the solution. The component remains in the aqueous phase and the surfactant goes into a surfactant-rich phase. The surfactant-rich phase can then be separated from the aqueous phase by conventional separation devices or techniques. This method is particularly applicable to concentrating surfactant recovered from a reservoir following an enhanced oil recovery process employing surfactant. The method may be practiced in the field or off-site.

19 Claims, 1 Drawing Figure

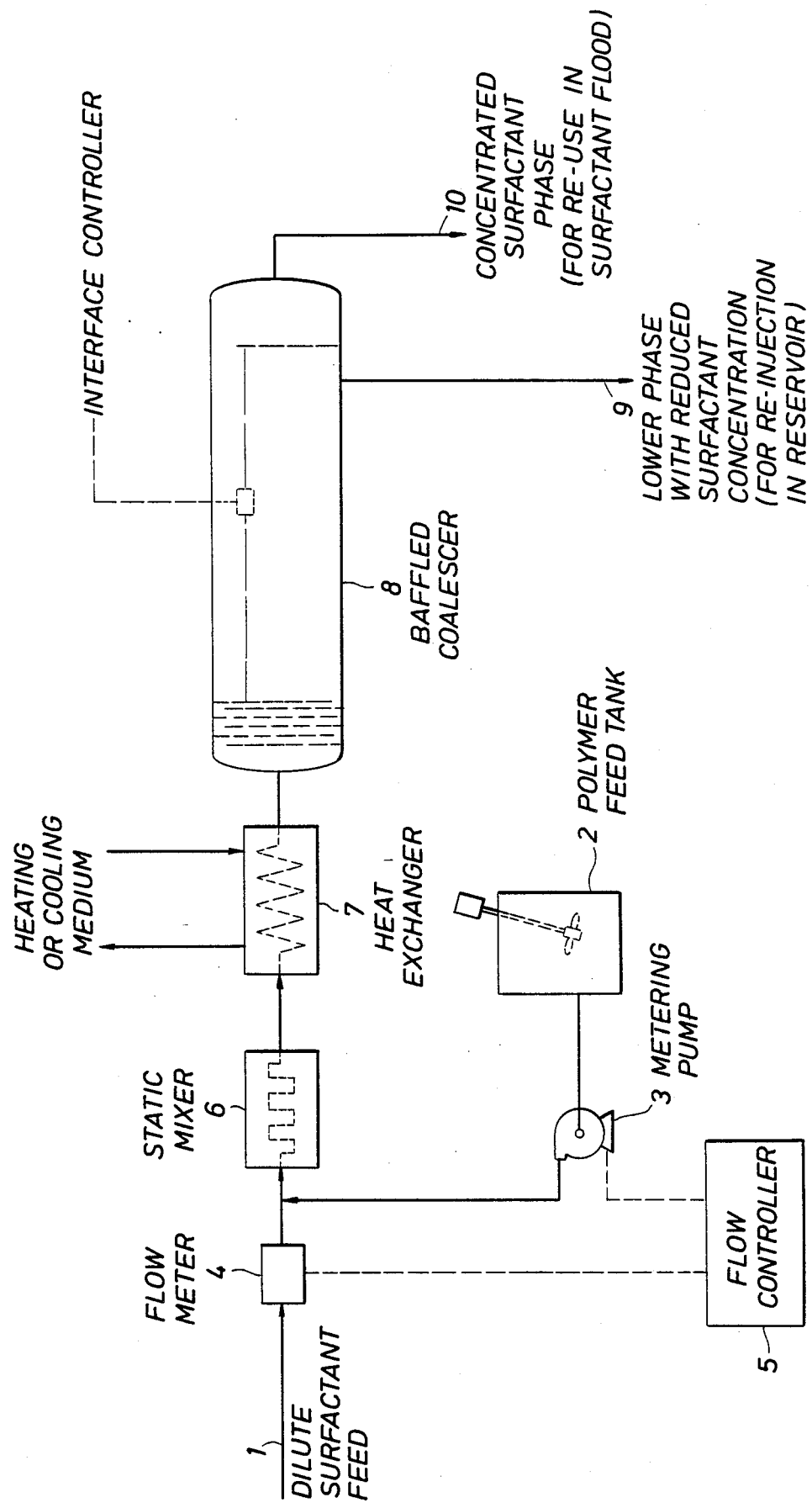
FIG. 1 EXAMPLE OF FIELD PRACTICE OF INVENTION

METHOD FOR CONCENTRATING SURFACTANT FROM A BRINE SOLUTION

BACKGROUND OF THE INVENTION

1. Field of the Invention

This invention relates to methods for concentrating surfactant solutions, particularly surfactant solutions comprising surfactant and water or brine. 2. Brief Description of the Prior Art The oil industry has recognized for many years that the natural formation of an oil reservoir will produce only a portion of the crude oil originally in the reservoir. The oil industry has conducted extensive research on many different oil recovery methods in its efforts to economically recover more oil from petroleum reservoirs.

Surfactant flooding is one such method. Surfactant flooding involves injection of a solution containing surface-active agents or surfactants into the oil reservoir. The objective of surfactant flooding is to reduce the oil/water interfacial tension to an extremely low value, normally less than 1/10,000 of that present in a regular waterflood and thus greatly reduce the capillary forces which will otherwise trap oil. The use of the term "surfactant flooding" used herein shall be understood to include microemulsion flooding and other variations of waterflooding involving surfactant, including flooding where both surfactant and polymer are involved. For further discussion of surfactant flooding and microemulsion flooding, see C. C. Mattax, R. J. Blackwell, and J. F. Tomich, "Recent Advances in Surfactant Flooding," *Proceedings of the Eleventh World Petroleum Congress* 205–215 (1984).

Recent developments have led to increased confidence that surfactant flooding can recover significant amounts of incremental oil from a range of reservoirs with different rock and fluid properties. Such developments are discussed briefly in the above reference by C. C. Mattax, R. J. Blackwell and J. F. Tomich. However, surfactants are costly. The extent to which surfactant flooding can be applied economically has been uncertain.

Noting the need to minimize surfactant costs with surfactant flooding for enhanced oil recovery, J. B. Allison, et al. in U.S. Pat. No. 4,277,352, issued June 29, 1982, disclosed a method of reducing the expense related to the surfactant in such flooding. That patent explained that considerable quantities of surfactant injected into the reservoir as a recovery agent for enhanced oil recovery are produced with the crude oil in the form of an oil/water emulsion with the surfactant in the oil phase. The claimed method is one of treating the emulsion with a water soluble solubilizing agent, selected from a certain group of alcohols, or mercaptans, in an aqueous medium. The solubilizing agent extracts the surfactant from the emulsion, partitioning it into the aqueous medium. The patent further discloses recycling the recovered surfactant in the aqueous medium to the reservoir to continue the enhanced oil recovery process.

U.S. patent application Ser. No. 529,190 filed Sept. 6, 1983 by J. R. Bragg, et al discloses another method of breaking oil-water-(or brine)-surfactant emulsions produced from surfactant flooding. That method breaks the emulsion by controlling temperature and salinity within certain operable ranges. The emulsion is broken into an easily separable oil phase and a water phase with the surfactant in the brine or water phase. The brine phase, containing the surfactant, is then ready for use in additional oil recovery once separated from the oil phase by conventional means. The application notes, however, that there may be some desire to concentrate the surfactant for reservoir reinjection or for ease in transportation and handling.

The procedure for concentrating the surfactant in the brine disclosed in U.S. patent application Ser. No. 529,190 generally depends on the type of surfactant. Heating is disclosed for surfactants with an optimal salinity which decreases with increasing temperature. Cooling is disclosed for surfactants with an optimal salinity which increases with increasing temperature.

SUMMARY OF THE INVENTION

The present invention is a method for concentrating surfactant in an aqueous solution. The method comprises adding a component, such as a water-soluble polymer, incompatible with the surfactant to the solution, thereby displacing the surfactant from the aqueous phase of the solution. The component remains in the aqueous phase, and the surfactant comes to reside in a surfactant-rich phase. The surfactant rich phase is then separated from the aqueous phase by conventional separation devices or techniques.

BRIEF DESCRIPTION OF THE DRAWING

FIG. 1 is a schematic configuration of mechanical equipment needed for an example of a practical field application of the present invention.

DESCRIPTION OF THE PREFERRED EMBODIMENT

This invention provides a method for concentrating surfactant in a water or brine solution. The solution may contain substances other than surfactant but preferably will primarily consist of surfactant and water or brine. An example of substances that may be present in the solution other than surfactant and brine is oil. The surfactant and any oil present will preferably reside within micelles uniformly dispersed within the aqueous phase. The solution can therefore be a lower phase microemulsion or an aqueous dispersion of surfactant (when no oil is present).

In the practice of this invention, a component, preferably in liquid form, is added to the water or brine solution containing the surfactant. The component must be a substance that, once it is dissolved or dispersed in the aqueous phase, causes the surfactant to be less compatible with the aqueous phase, forcing the surfactant to split out into a separate phase containing less water. Further, the component should preferably not react with or permanently alter the molecular structure of the surfactant in a manner that would preclude it's later reuse as a surfactant. The composition of the component will therefore depend on the composition of the surfactant. Examples of such components are high-molecular-weight water soluble polymers such as xanthan gum, polyacrylamides, scleroglucan and other polymers that are commonly used or recommended for use in waterflooding or enhanced oil recovery processes. These high-molecular weight polymers are believed to be excluded from the micelle structures in which the surfactant normally resides in aqueous solutions. For a discussion of surfactant phase behavior, see C. J. Glover, M. C. Puerto, J. M. Maerker, and E. I.

Sandirk, "Surfactant Phase Behavior and Retention in Porous Media," 19 *Soc. of Pet. Eng. Journal* 183-193 (June 1979).

Stable micelles contain surfactant and brine (or water), and may also contain oil. In the practice of this invention, the relatively large, high-molecular-weight polymer molecules are believed to be excluded from the micelles because their size is too large to fit within the micelle structure. Even so, the large polymer molecules compete with the surfactant for water, and thereby force the surfactant into a separate phase containing less water. Thus, the surfactant becomes more concentrated in the new excluded phase.

The quantity of component to be added to the water or brine solution containing surfactant will vary with the temperature, salinity and quantity of the solution, the concentration of the surfactant in the solution, and the ultimate desired concentration of the surfactant. Generally, the temperature, salinity and quantity of the solution will be known or can readily be determined by those skilled in the art. A component or polymer that will be stable at such temperature and salinity should preferably be selected. Various concentrations of the polymer can be added to test samples of the solution and the concentration of the resulting separated and concentrated surfactant phase measured to determine the concentration of polymer necessary to obtain the desired concentration of surfactant. Laboratory tests like those described in the "Laboratory Experiments" section of this application below may be used to determine the quantity of component to use for a particular solution.

The cost of the added component compared to the value of the recovered, concentrated surfactant is a further factor to be considered in choosing the component. Most preferably, the added component is a compound that can be beneficially used in the aqueous phase remaining after surfactant is separated.

Once added to the solution, the component will displace a surfactant from the aqueous phase and a surfactant-rich phase will form. Preferably, the added component will itself partition into the surfactant-rich phase to only a limited extent. The surfactant-rich phase is then separated from the aqueous phase by conventional separation devices or techniques, such as in a highly baffled, horizontal two-phase separator.

Application in Enhanced Oil Recovery

A preferred application of this invention is in relation to enhanced oil recovery processes, particularly surfactant flooding. Significant reduction in the cost of such flooding may be achieved by applying this invention in relation to recycling of surfactant recovered from fluid produced from surfactant floods. In such application, a preferred solution is that resulting from the process of breaking an oil-brine surfactant emulsion described in U.S. patent application Ser. No. 529,190 filed Sept. 6, 1983 by J. R. Bragg, et al. Such solution will preferably contain surfactant (dispersed) in brine and may also contain some (trace of) oil that did not go into the oil phase during the emulsion breaking process.

The surfactant will be one that is effective in enhancing the recovery of oil. It can be anionic, nonionic, cationic or a mixture or blend of surfactants. Generally, an example of a suitable surfactant for this invention is a sulfate or sulfonate of a propoxylated, ethoxylated tridecyl alcohol. Specific examples of suitable surfactants can be any of those surfactants which are described in the following nonlimiting list of patents: U.S. Pat. Nos. 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511; 3,469,630; 3,799,263; 3,885,626; 3,977,471 and 4,293,428.

The component that is added to the surfactant and brine solution and that is incompatible with surfactant in the brine phase will preferably be a water-soluble polymer. An example of such a polymer is Pfizer Flocon 4800 ™, but any water soluble polymer that is generally used or recommended for use in waterflooding or enhanced oil recovery as a viscosifier could be used. Particularly desirable is a polymer that is inexpensive and can be reused in the aqueous phase after the surfactant is separated. In this application of the invention, after separation of the surfactant-rich phase from the aqueous phase which retains substantially all the polymer, the surfactant is reinjected into the reservoir for further surfactant flooding. The aqueous phase containing the polymer may be injected separately into the reservoir as polymer drive water, thereby recovering the cost of the polymer used to concentrate the surfactant.

This application of the invention may be carried out offsite of an enhanced oil recovery project or on-site in the field, as described in the following example.

Example of Practical Field Application

This invention may be used in field practice to separate concentrated surfactant from a feed mixture of brine, dilute surfactant, and dilute oil. The feed is the aqueous phase resulting from prior processing of emulsions produced in surfactant floods. An example of the prior process used to generate the feed is that described in U.S. patent application Ser. No. 529,190 filed Sept. 6, 1983 by J. R. Bragg et al, which removes substantially all oil from the emulsion, leaving the surfactant in the aqueous phase. The configuration of mechanical equipment required to practice the present invention as described in this example is illustrated in FIG. 1. The individual pieces of mechanical equipment are readily available and can be designed to achieve results desired by those skilled in mechanical design.

Feed stream 1 comprises brine, dilute surfactant, and minor amounts of oil solubilized by the surfactant. (That is, the feed stream is primarily comprised of brine but also comprises surfactant at less than the desired concentration and may also comprise some oil.) Polymer for addition to the feed is stored in polymer feed tank 2. Polymer feed can comprise biopolymer liquid broth, such as Pfizer's Flocon 4800 ™, hydrated dry biopolymer dissolved in brine (preferably of same salinity as feed 1), or other suitable water-soluble polymer. The flow rate of feed 1 is measured by flow meter 4, and flow controller 5 adjusts the speed of metering pump 3 so that the desired polymer concentration in resulting mixture of feed 1 and polymer is maintained at target. The resulting mixture is uniformly mixed in static mixer 6.

Depending upon the type of surfactant and the dependence of the water solubilization of the surfactant versus temperature, the mixture may be heated or cooled in heat exchanger 7 prior to phase separation in coalescer 8. If water solubilization ($V_w/V_s$) by the specific surfactant decreases with increasing temperature, the feed may be heated to enhance concentrating ability of the polymer. Cooling will enhance concentration if $V_w/V_s$ decreases with decreasing temperature. $V_w/V_s$ is the water solubilization parameter, defined as the ratio of the volume of water (or brine) solubilized in the phase per volume of surfactant in that phase.

Coalescer 8 is a baffled separator (a horizontal configuration is shown as an example). The concentrated surfactant and minor amounts of oil separate by gravity to form an upper phase that is withdrawn as stream 10. This concentrated surfactant can then be used to reconstitute additional microemulsion for flooding additional portions of the reservoir.

Stream 9 contains most of the polymer added to the feed plus substantially reduced concentration of surfactant in brine. Stream 9 can be reinjected as polymer drive water in the reservoir, thus recovering the polymer for alternate use and substantially reducing waste.

Laboratory Experiments

Laboratory results confirmed that this invention may be applied practically and economically. Several experiments were conducted by adding various concentrations of 4800 FLOCON ™ xanthan polymer to a feed mixture that was the aqueous phase remaining after oil had been separated from fluid produced from a surfactant flood using the emulsion breaking process described in U.S. patent application Ser. No. 529,190 filed Sept. 6, 1983 by J. R. Bragg et al. This feed mixture contained surfactant at concentrations of about one-half of the concentration desired for reuse in a surfactant flood. The feed mixture contained 1.016 weight percent active surfactant, 1.2 volume percent crude oil, and brine having the composition shown in Table I. The surfactant was a sulfate of a propoxylated, ethoxylated tridecyl alcohol.

TABLE I

| Brine Composition in Feed Mixture | |
|---|---|
| Ion | Milligrams/Liter |
| sodium | 34,680 |
| calcium | 2,725 |
| magnesium | 1,160 |
| barium | 60 |
| chloride | 61,650 |
| bicarbonate | 135 |
| iron | 10 |
| Total dissolved solids | 100,420 |

The effectiveness of added polymer on concentrating surfactant was investigated by adding polymer to obtain polymer concentrations in the feed ranging from 0 to 500 ppm active xanthan. Further, the effect of temperature was studied by repeating experiments at both 78° F. and 92° F. A concentrated polymer liquid was prepared by mixing 4800 FLOCON ™ xanthan broth with a small amount of brine having the composition shown in Table I. Various amounts of this concentrated polymer liquid were then mixed with the feed to obtain the target polymer concentration in the mixture. A volume of 30 ml of each mixture was placed in a sealed test tube and left to equilibrate. Depending upon polymer concentration, the mixture would then separate into two phases whose volumes could be measured.

In addition to measuring phase volumes after equilibration, the concentrations of surfactant and polymer in each phase were also measured. Results of the concentrating experiments are shown in Table II.

TABLE II

Results of Laboratory Experiments of Concentrating Surfactant Using Polymer

| Initial Concentrations in Feed and Polymer Solution | | Equilibrated Phase Volumes (ml) | | Surfactant Concentration (gm surfactant/100 ml) | | Polymer Concentration (ppm) | | Partition Coefficient (Conc. in Upper $\phi$/ Conc. in Lower $\phi$) | | Material Balance Amount in lower & Upper $\phi$/Initial Amount in Feed (%) | |
|---|---|---|---|---|---|---|---|---|---|---|---|
| Surfactant, % | Polymer, ppm | Upper $\phi$ | Lower $\phi$ | Upper $\phi$ | Lower $\phi$ | Upper $\phi$ | Lower $\phi$ | Surfactant | Polymer | Surfactant | Polymer |
| 78° F. | | | | | | | | | | | |
| 1.016 | 0 | 0 | 30.0 | | 1.016 | | NM* | | | 100% | |
| 1.006 | 50 | 0 | 30.0 | | NM* | | NM* | | | NM* | |
| .996 | 100 | 0 | 30.0 | | 1.001 | | NM* | | | 99.5% | |
| .986 | 150 | 0 | 30.0 | | NM* | | NM* | | | NM* | |
| .975 | 200 | 26.3 | 3.7 | 1.030 | NM* | 163 | 540 | NM* | .302 | NM* | 104.7% |
| .965 | 250 | 22.2 | 7.8 | 1.134 | .371 | 155 | 549 | 3.057 | .282 | 103.1% | 103.0% |
| .945 | 350 | 18.7 | 11.3 | 1.349 | .328 | 148 | 665 | 4.113 | .223 | 98.0% | 97.9% |
| .914 | 500 | 15.0 | 15.0 | 1.612 | .237 | 146 | 834 | 6.802 | .175 | 98.9% | 98.0% |
| 92° F. | | | | | | | | | | | |
| 1.016 | 0 | 0 | 30.0 | | 1.016 | | NM* | | | 100% | |
| 1.006 | 50 | 0 | 30.0 | | NM* | | NM* | | | NM* | |
| .996 | 100 | 0 | 30.0 | | NM* | | 0 | 96 | | NM* | 96.0% |
| .986 | 150 | 16.4 | 13.6 | 1.528 | .468 | 66 | 237 | 3.265 | .278 | 94.1% | 95.7% |
| .975 | 200 | 15.2 | 14.8 | 1.682 | .360 | 70 | 327 | 4.672 | .214 | 94.7% | 98.4% |
| .945 | 350 | 12.5 | 17.5 | 2.124 | .202 | 80 | 542 | 10.515 | .147 | 94.2% | 99.9% |
| .914 | 500 | 9.0 | 21.0 | 2.596 | .175 | 103 | 673 | 14.834 | .153 | 101.4% | 100.4% |

*NM = Not Measured

Tabulated are the volumes of resulting upper and lower phases, the surfactant and polymer concentrations in each phase, the partition coefficient for surfactant and polymer, and a material balance to confirm the accuracy of the measured concentrations. The partition coefficient is defined as the concentration of species in the upper phase divided by the species concentration in the lower phase, and it gives a measure of the concentrating effect on surfactant and a measure of the fraction of total polymer remaining in the upper phase. Such measures of partition coefficients readily permit one to determine the fraction of feed surfactant recovered in the concentrated upper phase and the amount of polymer not recovered in the lower phase. In the preferred embodiment of this invention, the lower phase would be reinjected as polymer drive water, and polymer in the lower phase would therefore be reused and have no net added cost. Polymer remaining in the upper phase is not readily reusable, so it is desirable to obtain as small a partition coefficient for polymer as possible to prevent waste and reduce cost.

Results show that as the polymer concentration in the feed is increased from 0 to 150 ppm no detectable concentrating of the surfactant is noted at 78° F., but polymer concentrations of 200 ppm or higher cause surfactant to be concentrated in an upper phase that splits out from the mixture. At 92° F. the separation is enhanced, and surfactant is concentrated at feed polymer concentrations of 150 ppm or higher. As shown by the partition coefficients, the surfactant concentration is 6.8 fold greater in the upper phase than in the lower phase at 78° F. for 500 ppm polymer. At 92° F. and 500 ppm, the surfactant concentration is 14.8 fold higher in the upper phase, and the resulting surfactant concentration in the recovered upper phase is 2.84 times more concentrated than in the original feed. Further, for this experiment about 85.2% of the surfactant in the feed was recovered in the concentrated upper phase, and 94.2% of the polymer was recovered for reuse in the lower phase. The amount of polymer used in the feed mixture (500 ppm) is not excessive since polymer drive water of 500 ppm or higher would often be injected into the reservoir simultaneously while this invention is being practiced. Thus, most of the polymer is reused after practice of this invention.

The principles of the invention and its best mode have been described. It is to be understood that the foregoing is illustrative only and that other means and techniques can be employed without departing from the true scope of the invention defined by the following claims.

I claim:

1. A method for concentrating surfactant in the aqueous phase from a broken emulsion of oil-surfactant-brine produced from an oil-bearing reservoir into which surfactant had been injected to enhance the recovery of oil therefrom comprising:
   (a) adding to said aqueous phase a polymer which is not compatible with said surfactant in said aqueous phase, thereby displacing said surfactant from said aqueous phase and creating a surfactant-rich phase, said polymer remaining in said aqueous phase; and
   (b) separating said surfactant-rich phase from said aqueous phase.

2. The method of claim 1 wherein said surfactant is a sulfate of oxyalkylated tridecyl alcohol.

3. The method of claim 1 further comprising reinjecting into said reservoir said surfactant separated from said aqueous phase.

4. The method of claim 1 further comprising injecting said aqueous phase containing said polymer into said reservoir.

5. The method of claim 1 wherein said polymer is derived from the action of Xanthomonas bacteria on a polysaccharide.

6. The method of claim 1 wherein said polymer is a polyacrylamide.

7. The method of claim 1 wherein said polymer is a scleroglucan.

8. A method for separating surfactant from an aqueous solution comprising:
   (a) adding to said solution comprising surfactant a water-soluble polymer not compatible with said surfactant in said aqueous phase;
   (b) allowing said surfactant to separate into a surfactant-rich phase in said solution, and said polymer remaining in the aqueous phase of said solution; and
   (c) withdrawing said surfactant-rich phase from said solution.

9. A method for removing surfactant from an aqueous solution comprising:
   (a) adding said aqueous solution comprising surfactant to a water-soluble polymer in liquid form;
   (b) mixing said solution with said polymer;
   (c) allowing said mixture to form a surfactant-rich phase and an aqueous phase comprising said polymer; and
   (d) separating said surfactant-rich phase from said aqueous phase.

10. The method of claim 9 wherein said separation of said surfactant-rich phase and said aqueous phase is accomplished in a coalescer.

11. A method for producing a surfactant-rich phase in an aqueous solution comprising surfactant, said method comprising:
    (a) adding a water-soluble polymer to said aqueous solution;
    (b) mixing said polymer in said solution; and
    (c) allowing a surfactant-rich phase to form in said solution, said polymer remaining in the aqueous phase of said solution.

12. The method of claim 11 wherein the water solubilization of said surfactant decreases with increasing temperature, said method further comprising heating said mixture of polymer and aqueous solution comprising surfactant.

13. The method of claim 11 wherein the water solubilization of said surfactant increases with increasing temperature, said method further comprising cooling said mixture of polymer and aqueous solution comprising surfactant.

14. An improved method for surfactant-enhanced recovery of oil from an oil-bearing reservoir comprising:
    (a) flooding an oil bearing reservoir with water comprising surfactant;
    (b) producing oil from said reservoir, said oil being produced in an emulsion of oil, brine and surfactant;
    (c) breaking said emulsion and separating said oil from said brine and surfactant;
    (d) adding a water soluble polymer to said brine and surfactant causing said surfactant to form a surfactant-rich phase in said brine;
    (e) separating said surfactant-rich phase from said brine; and
    (f) reusing said surfactant in continuing said surfactant flooding of the reservoir.

15. The method of claim 14 further comprising injecting said brine comprising said polymer into said reservoir.

16. The method of claim 15 wherein said polymer is a biopolymer.

17. A method for concentrating surfactant in aqueous solution, comprising:
    (a) adding to said solution a polymer with which said surfactant is not compatible in the aqueous phase of the solution such that said surfactant is displaced from said aqueous phase of said solution and thereby creating a surfactant-rich phase in said solution, with said polymers remaining in said aqueous phase; and
    (b) separating said surfactant-rich phase from said aqueous phase.

18. The method of claim 17 where said polymer is derived from action of Xanthomonas bacteria on a polysaccharide.

19. A method for concentrating a sulfate of an oxyalkylated, tridecyl alcohol in aqueous solution, comprising:
(a) adding to said solution a polymer with which said sulfate is not compatible in the aqueous phase of the solution such that said sulfate is displaced from said aqueous phase of said solution and thereby creating a sulfate-rich phase in said solution, with said polymer remaining in said aqueous phase; and
(b) separating said sulfate-rich phase from said aqueous phase.

* * * * *